UNITED STATES PATENT OFFICE.

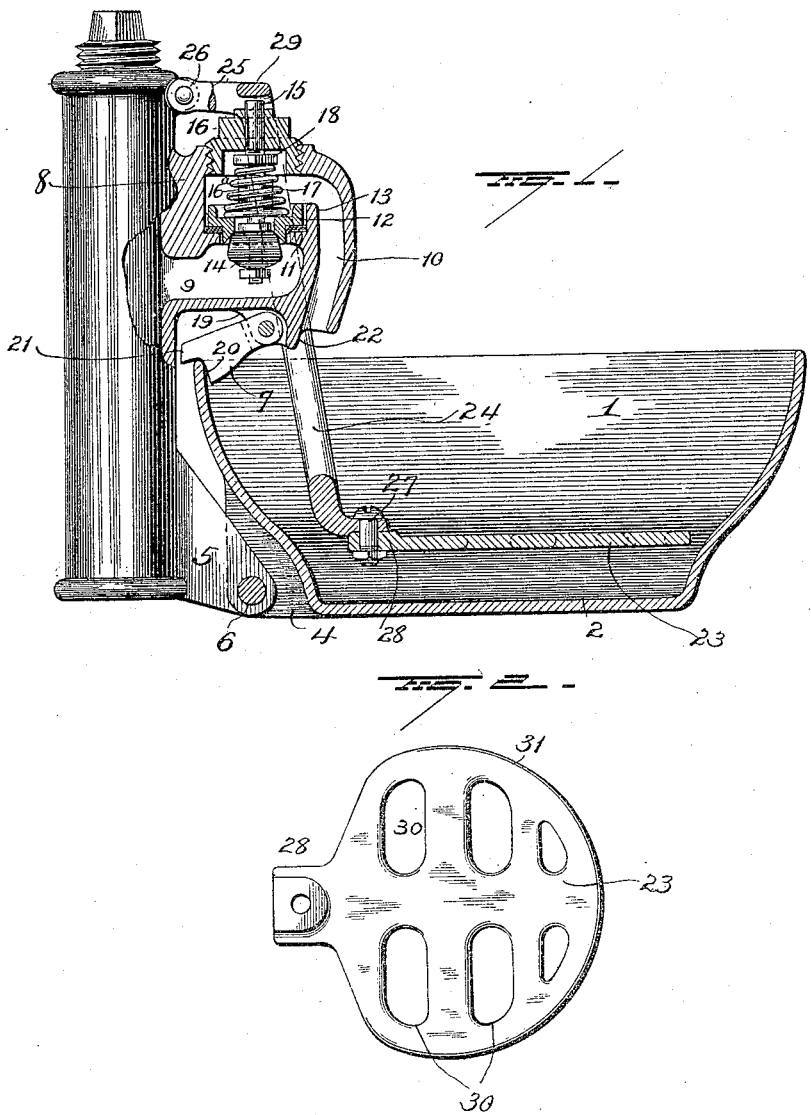

HUGO C. RASSMANN, OF BEAVER DAM, WISCONSIN.

WATERING DEVICE FOR CATTLE.

1,210,693.  Specification of Letters Patent.  Patented Jan. 2, 1917.

Application filed October 19, 1916. Serial No. 126,550.

*To all whom it may concern:*

Be it known that I, HUGO C. RASSMANN, a citizen of the United States, and a resident of Beaver Dam, in the county of Dodge and State of Wisconsin, have invented certain new and useful Improvements in Watering Devices for Cattle; and I do hereby declare the following to be a full, clear, and exact description of the invention, such as will enable others skilled in the art to which it appertains to make and use the same.

This invention relates to improvements in watering devices for cattle,—objects of the invention to improve and simplify the construction of such devices, to so construct the valve operating lever that its coöperation with the valve shall be direct and so that its pedal portion shall not interfere with rings which may be connected with the noses of cattle; to provide a simple and efficient latch construction for the pivoted bowl which cannot be accidentally unlatched by the cattle, and to protect the pivotal connection of said latch from the corroding effect of water.

With these and other objects in view, the invention consists in certain novel features of construction and combinations of parts as hereinafter set forth and pointed out in the claims.

In the accompanying drawings; Figure 1 is a sectional view, partly in elevation, showing my improvements, and Fig. 2 is a top plan view of the pedal or platform portion of the valve-operating lever.

1 represents a drinking bowl for cattle, which is preferably formed with a central depressed portion 2 in its bottom to receive and contain a comparatively small quantity of water at all times to constitute a bait for the cattle. The bowl is pivotally connected, at one end to a stand pipe 3, for which purpose the bowl and stand pipe are provided, respectively, with lugs 4—5 connected by a pivot pin 6,—the bowl being held in a normal horizontal position by means of a latch device 7 as hereinafter more specifically explained.

The casing 8 is provided on the stand-pipe and may be cast integral therewith as shown in Fig. 1. This casing is formed with a duct 9 communicating with the stand-pipe 3, and said casing is also made with a discharge duct or spout 10, the lower portion of which is somewhat inclined rearwardly so as to discharge water rearwardly into the rear portion of the bowl 1 in a manner not to interfere with an animal which may be in the act of drinking.

Between the ducts 9 and 10, an annular, horizontally disposed shoulder 11 is formed within the casing 8 for the accommodation of a member forming a valve seat 12, and between said valve seat and shoulder, a gasket 13 is located. A valve 14 seats upwardly against the valve seat and the stem 15 of this valve extends upwardly and passes freely through a hole in a cap 16 screwed into the top of the casing 8, and connected with the valve seat member as indicated at 16ª. A spring 17, encircling the stem 15 bears at its lower end against the valve seat 12 and at its upper end against a collar 18 on the stem 15, said spring thus normally operating to retain the valve against its seat and prevent the flow of water to the bowl.

The casing 8 is provided at its bottom with a lug or ear 19 to which one end of the latch 7 is pivotally connected, said latch projecting rearwardly from its pivotal connection and provided with a shoulder 20 to engage the end of the bowl and with a lip or flange 21 to project over the upper edge of the bowl. The casing is formed near the pivoted end of the latch with a lip 22 which serves to house the pivotal connection of the latch to the casing and thus protect said pivoted connection from water which might cause corrosion.

The valve 14 is operable by the cattle, through the medium of a lever. This lever comprises a pedal or platform 23 and a yoke portion 24. The yoke portion of the lever is provided at its upper end with lateral arms 25 which are pivotally connected with a lug 26 on the upper portion of the stand pipe 2. The yoke portion of the lever is disposed in slightly inclined position and its lower end is secured by means of a bolt 27 to a shank 28 on the pedal or platform member 23 of the lever.

At or near the juncture of the lateral arms 25 with the members of the yoke 22, a cross bar 29 is provided so as to be disposed directly over the valve stem 15. A direct and positive operating connection is thus afforded between the pedal or platform member of the lever and the valve.

The pedal or platform member 23 is made of open work,—having slots or openings 30 and a continuous rim portion 31, so that there will be no danger of rings, which are sometimes connected with the noses of the cattle, becoming entangled with said pedal or platform 23.

Various slight changes might be made in the details of construction of my invention without departing from the spirit thereof or limiting its scope and hence I do not wish to restrict myself to the precise details herein set forth.

Having fully described my invention, what I claim as new and desire to secure by Letters-Patent, is:—

1. In a watering device for cattle, the combination with a bowl, a stand pipe, a valve casing carried by the stand pipe and provided with a discharge outlet over the bowl, and a valve having a vertical stem projecting above the casing, of a yoke pivoted to the stand pipe above the casing and embracing the latter, a pedal member secured to the lower end of the yoke within the bowl, and a cross bar between the members of the pivoted yoke at a point between the pivotal support of said yoke and the pedal member and disposed over the stem of the valve for operating the latter.

2. In a watering device for cattle, the combination with a stand pipe, a pivoted bowl, and a casing carried by the stand pipe and having a discharge outlet over said bowl, of a latch pivotally attached to the bottom of the casing and projecting rearwardly therefrom and adapted at its free end to engage the rear end of the bowl.

3. In a watering device for cattle, the combination with a stand pipe, and a casing carried by the stand pipe and having a water outlet disposed over the bowl, said casing having a lip at its lower end adjacent to said water outlet, of a latch having pivotal connection with the casing adjacent to said lip whereby said pivotal connection is protected by said lip, said latch projecting rearwardly from its pivotal connection with the casing and adapted to engage the rear end of the bowl.

In testimony whereof, I have signed this specification in the presence of two subscribing witnesses.

HUGO C. RASSMANN.

Witnesses:
H. R. VETTER,
A. B. CHANDLER.

Copies of this patent may be obtained for five cents each, by addressing the "Commissioner of Patents, Washington, D. C."